United States Patent
Ha et al.

(10) Patent No.: US 9,326,249 B2
(45) Date of Patent: Apr. 26, 2016

(54) POWER SAVING APPARATUS AND METHOD FOR MOBILE TERMINAL

(71) Applicant: Samsung Electronics Co. Ltd., Suwon-si, Gyeonggi-do (KR)

(72) Inventors: Younghee Ha, Yongin-si (KR); Hyojae Cho, Yongin-si (KR); Seyoung Jang, Seongnam-si (KR); Seunghwan Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 13/654,908

(22) Filed: Oct. 18, 2012

(65) Prior Publication Data

US 2013/0111241 A1 May 2, 2013

(30) Foreign Application Priority Data

Oct. 26, 2011 (KR) .................. 10-2011-0110120

(51) Int. Cl.
*G06F 1/00* (2006.01)
*G06F 1/26* (2006.01)
(Continued)

(52) U.S. Cl.
CPC .......... *H04W 52/029* (2013.01); *H04W 52/027* (2013.01); *H04W 52/0251* (2013.01); *Y02B 60/50* (2013.01)

(58) Field of Classification Search
CPC ..... G06F 1/324; G06F 1/3218; G06F 1/3265; G06F 1/3212
USPC .................................. 713/300, 320
See application file for complete search history.

(56) References Cited

U.S. PATENT DOCUMENTS 5,598,565 A * 1/1997 Reinhardt ................ 713/323
5,787,292 A * 7/1998 Ottesen et al. ............ 713/300
(Continued)

FOREIGN PATENT DOCUMENTS

| EP | 1292040 A2 | 3/2003 |
| EP | 1575178 A2 | 9/2005 |

(Continued)

OTHER PUBLICATIONS kimiraikkonen, Minimum Processor State and Corei7 confusion on Win7, Jun. 1, 2011, http://forum.notebookreview.com/threads/minimum-processor-state-and-corei7-confusion-on-win7.582849/.*

(Continued)

*Primary Examiner* — Mark Connolly
(74) *Attorney, Agent, or Firm* — Jefferson IP Law, LLP (57) ABSTRACT

A power saving apparatus and a method for a mobile terminal are provided. The method includes measuring a system load for a preset time during an application execution in a power saving mode, setting, when the measured system load exceeds a reference load level, a limit clock frequency as a maximum clock frequency for the power saving mode, measuring, in the power saving mode, the system load due to the application execution, performing, when the measured system load exceeds the reference load level, the application execution at the limit clock frequency, and performing, when the measured system load does not exceed the reference load level, the application execution at a system clock frequency corresponding to the measured system load, where performing the application execution at the limit clock frequency reduces a battery power consumption.

15 Claims, 7 Drawing Sheets

(51) Int. Cl.
*G06F 1/32* (2006.01)
*H04W 52/02* (2009.01)

(56) References Cited

U.S. PATENT DOCUMENTS

| | | | |
|---|---|---|---|
| 6,574,739 B1* | 6/2003 | Kung et al. | 713/322 |
| 6,668,318 B1* | 12/2003 | Jenkins et al. | 713/1 |
| 6,711,447 B1* | 3/2004 | Saeed | 700/82 |
| 7,069,463 B2* | 6/2006 | Oh | 713/503 |
| 7,263,622 B2* | 8/2007 | Ohba | 713/323 |
| 7,538,762 B2* | 5/2009 | Fletcher et al. | 345/211 |
| 7,653,825 B1* | 1/2010 | White et al. | 713/322 |
| 7,694,160 B2* | 4/2010 | Esliger et al. | 713/320 |
| 7,725,747 B2* | 5/2010 | Zimmer et al. | 713/322 |
| 8,051,310 B2* | 11/2011 | He et al. | 713/320 |
| 8,458,498 B2* | 6/2013 | Rotem et al. | 713/320 |
| 2002/0040442 A1* | 4/2002 | Ishidera | 713/300 |
| 2003/0226047 A1 | 12/2003 | Park et al. | |
| 2004/0039954 A1 | 2/2004 | White et al. | |
| 2004/0117680 A1 | 6/2004 | Naffziger | |
| 2006/0033744 A1 | 2/2006 | Perez | |
| 2006/0047987 A1 | 3/2006 | Prabhakaran et al. | |
| 2007/0285428 A1 | 12/2007 | Foster et al. | |
| 2008/0143729 A1 | 6/2008 | Wyatt et al. | |
| 2008/0201716 A1 | 8/2008 | Du et al. | |
| 2008/0301479 A1* | 12/2008 | Wood | 713/322 |
| 2010/0115259 A1 | 5/2010 | Elsila et al. | |
| 2011/0145617 A1* | 6/2011 | Thomson et al. | 713/323 |
| 2012/0105405 A1* | 5/2012 | Hsiao et al. | 345/208 |

FOREIGN PATENT DOCUMENTS

| | | |
|---|---|---|
| GB | 2446168 A | 8/2008 |
| KR | 10-2003-0047447 A | 6/2003 |
| KR | 10-2007-0033181 A | 3/2007 |
| KR | 1020070049328 A | 5/2007 |
| KR | 10-2008-0054480 A | 6/2008 |
| KR | 100934243 A | 12/2009 |
| KR | 10-2011-0028803 A | 3/2011 |

OTHER PUBLICATIONS

Boris_yo, What Is Minimum Ad Maximum Processor State in Windows 7 Power Management?, Sep. 12, 2011, https://web.archive.org/web/20110912011043/http://superuser.com/questions/323738/what-is-minimum-and-maximum-processor-state-in-windows-7-power-management.*

* cited by examiner

POWER SAVING APPARATUS AND METHOD FOR MOBILE TERMINAL

PRIORITY

This application claims the benefit under 35 U.S.C. §119(a) of a Korean patent application filed on Oct. 26, 2011 in the Korean Intellectual Property Office and assigned Serial No. 10-2011-0110120, the entire disclosure of which is hereby incorporated by reference.

BACKGROUND OF THE INVENTION

1. Field of the Invention

The present invention relates to power saving in a mobile terminal. More particularly, the present invention relates to an apparatus and method that enable a mobile terminal to reduce power consumption according to a system load.

2. Description of the Related Art

Mobile terminals may have diverse and composite functions, and may perform multiple functions at the same time. Mobile terminals use batteries as a power source. When a mobile terminal performs composite functions, the battery more rapidly discharges. As the battery has a limited capacity, execution of composite functions reduces usage time of the battery.

In a mobile terminal, a clock frequency can also affect battery power consumption. However, a mobile terminal may be driven by a preset clock frequency regardless of battery power consumption, and the user may be unable to change the clock frequency. In some cases, to save battery power, a mobile terminal may turn off selected components or restrict use of selected services. In other words, a typical mobile terminal is allowed to operate at a fixed maximum clock frequency (for the application processor) and a fixed maximum frame rate (for the display unit), which are set so as to produce maximum system performance without consideration of system load and battery power consumption. In this case, when system load increases, the system clock frequency also increases, which in turn increases the rate of battery power consumption.

Therefore, a need exists for a power saving apparatus and method for a mobile terminal.

SUMMARY OF THE INVENTION

Aspects of the present invention are to address at least the above problems and/or disadvantages and to provide at least the advantages described below. Accordingly, as aspect of the present invention is to provide an apparatus and method that enable a mobile terminal to reduce battery power consumption by limiting a clock frequency and a frame rate according to a system load. This prolongs the battery usage time between charges according to a selection of the user utilizing the mobile terminal.

In accordance with an aspect of the present invention, a power saving apparatus for a mobile terminal is provided. The apparatus includes a battery supplying power to individual components of the mobile terminal, a storage unit storing information regarding a maximum clock frequency for a normal operation mode and a limit clock frequency lower than the maximum clock frequency, and a control unit measuring, during an application execution in the power saving mode, a system load, and performing the application execution at the limit clock frequency, wherein performing the application execution at the limit clock frequency reduces a battery power consumption.

The power saving apparatus may further include a display unit, and the control unit may control, in the power saving mode, the display unit to display data stored in a frame buffer at a limit frame rate lower than a default frame rate for the normal operation mode, wherein displaying the data at the limit frame rate reduces the battery power consumption.

In accordance with another aspect of the present invention, a power saving method, for a mobile terminal including a battery supplying power to individual components and a storage unit storing information regarding a maximum clock frequency for a normal operation mode and a limit clock frequency lower than the maximum clock frequency for a power saving mode, is provided. The method includes measuring a system load for a preset time during an application execution in the power saving mode, setting, when the measured system load exceeds a reference load level, the limit clock frequency as a maximum clock frequency for the power saving mode, measuring, in the power saving mode, the system load due to the application execution, performing, when the measured system load exceeds the reference load level, the application execution at the limit clock frequency, and performing, when the measured system load does not exceed the reference load level, the application execution at a system clock frequency corresponding to the measured system load, wherein performing the application execution at the limit clock frequency reduces a battery power consumption.

The power saving method may further include setting a limit frame rate for the power saving mode lower than a default frame rate for the normal operation mode, and controlling, during the application execution in the power saving mode, a display operation to display data stored in a frame buffer at the limit frame rate, wherein displaying the data at the limit frame rate reduces the battery power consumption.

In accordance with another aspect of the present invention, a power saving method, for a mobile terminal comprising a battery supplying power to individual components and a storage unit storing information regarding a maximum clock frequency for a normal operation mode and a limit clock frequency lower than the maximum clock frequency for a power saving mode, is provided. The method includes activating a power saving mode to apply the limit clock frequency by selecting a power saving menu item of an environment setting menu, measuring, in the power saving mode, a system load during an application execution, performing, when the measured system load exceeds a reference load level, the application execution at the limit clock frequency, and performing, when the measured system load does not exceed the reference load level, the application execution at a system clock frequency corresponding to the measured system load, wherein performing the application execution at the limit clock frequency reduces a battery power consumption.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present invention, the performance of the mobile terminal may be lowered according to a user's selection or a remaining battery power so as to reduce the power consumption in components of the mobile terminal. The remaining battery usage time of the mobile terminal is determined by the amount of current consumed by individual components, and the performance of the components is affected by the amount of current consumed therein. The components normally are optimized to yield maximum terminal performance. When the user executes an application program that is not performance critical, or simply wishes to reduce battery power consumption, the mobile terminal may be operated at a limited system clock frequency and limited frame rate that are respectively lower than the maximum system clock frequency and maximum frame rate but do not thereby significantly degrade the usability of the mobile terminal. Because changes to the system clock frequency and the maximum frame rate can have different impacts on the performance of different applications, an optimized limited system clock frequency for the application processor or an optimized limited frame rate for data display may be determined by trial-and-error. This power saving option may be enabled according to user selection or system states.

In the power saving mode of the present invention, to reduce the battery power consumption, the maximum clock frequency for the control unit and the maximum frame rate (frames per second) for the display unit may be lowered according to the system load (Central Processing Unit (CPU) load). In the following description, the term "limit clock frequency" refers to the maximum clock frequency allowed in the power saving mode.

Figure 1:
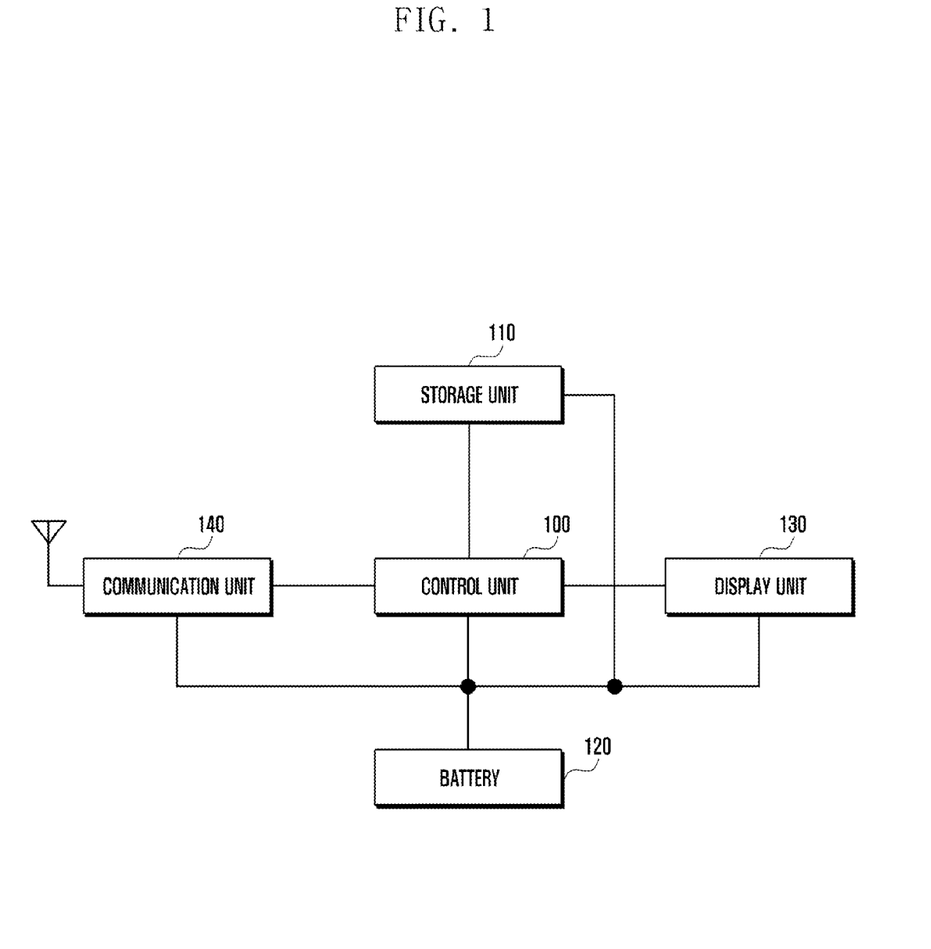
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, the communication unit 140 performs wireless communication with a base station or another mobile terminal. The communication unit 140 may include a transmitter (not shown) for upconverting a frequency of a signal to be transmitted and for amplifying the signal, and a receiver (not shown) for low-noise amplifying a received signal and for downconverting a frequency of the received signal. The communication unit 140 may further include a modulator/demodulator (not shown), which modulates a signal to be transmitted and forwards the modulated signal to the transmitter, and demodulates a signal received through the receiver. Here, modulation and demodulation may be conducted according to Long Term Evolution (LTE), Wideband Code Division Multiple Access (WCDMA), Global System for Mobile Communications (GSM), Wi-Fi, Wireless Broadband (WiBro), Near Field Communications (NFC), or Bluetooth.

The control unit 100 controls the overall operation of the mobile terminal, and performs operations for the power saving mode. The control unit 100 may be an Application Processor (AP) controlling an application execution.

The storage unit 110 may include a program section to store programs for operating the mobile terminal and implementing functions of the present invention, and a data section to store tables used for the mobile terminal and data generated in the course of using the mobile terminal. In particular, the storage unit 110 may store a table specifying the limit clock frequency and the limit frame rate of the power saving mode.

The display unit 130 displays data at a preset frame rate and at a preset brightness level under the control of the control unit 100. For example, under the control of the control unit 100, the display unit 130 may display data from the control unit 100 at a User Interface (UI) rendering rate of 60 Hertz (Hz) in the normal operation mode, and may display data from the control unit 100 at a UI rendering rate of 30 Hz in the power saving mode.

The battery 120 supplies power to individual components of the mobile terminal. A power supply rate of the battery 120 is adjusted according to the operating mode of the control unit 100.

Next, a description is given of a scheme for restricting the maximum clock frequency of the control unit in the mobile terminal.

In an exemplary embodiment, the control unit 100 measures the average CPU load (in percent) for a given time duration and stores the measured average CPU load, and determines the maximum clock frequency according to the measured average CPU load. More specifically, upon awakening from a sleep state, the control unit 100 configures the system clock frequency according to the amount of activities to process. When the amount of activities increases, the CPU load also increases. Then, the control unit 100 raises the system clock frequency to increase the processing speed.

Here, the system clock frequency may be raised in stages. For example, the control unit 100 may check the CPU load once per given time period (for example, every 50 milliseconds (ms)), and increase the system clock frequency by a given value if the CPU load exceeds a predetermined load level. When this procedure is repeated several times, the maximum clock frequency may be reached. Here, the maximum clock frequency corresponds to the highest clock frequency allowed for the application processor.

In the power saving mode, in order to reduce the power consumed by the control unit (application processor), the maximum clock frequency is limited according to system load (CPU load). Here, the power saving mode may be enabled manually by the user or automatically by the system according to the remaining battery power.

A first scheme for determining the system clock frequency in the power saving mode is to use the CPU load. That is, a variable (Count_CPU_Max_freq) is provided in the storage unit 110. Count_CPU_Max_freq is used to count the number of times the current clock frequency is equal to the maximum clock frequency allowed in the normal operation mode in a given time period. When Count_CPU_Max_freq is above a predetermined value, the maximum clock frequency is lowered (that is, the limit clock frequency is set). Here, when Count_CPU_Max_freq is greater than or equal to the predetermined value, the control unit 100 may lower the maximum clock frequency by one level or two levels.

A second scheme for determining the system clock frequency in the power saving mode is to use a fixed clock frequency lower than the maximum clock frequency. Such a fixed clock frequency may be determined by trial-and-error so as not to cause a noticeable inconvenience to the user during application utilization. The determination may be performed by the manufacturer based on preloaded applications. Alternatively, the determination may be performed during use by a user, based on the applications the user uses.

In the power saving mode, not only the system clock frequency but also the frame rate for data display can be lowered. That is, to reduce the power consumption in the power saving mode, the control unit may process applications at the limit clock frequency according to the system load, and control the display unit 130 to display data stored in the frame buffer at a lower frame rate.

Figure 2:
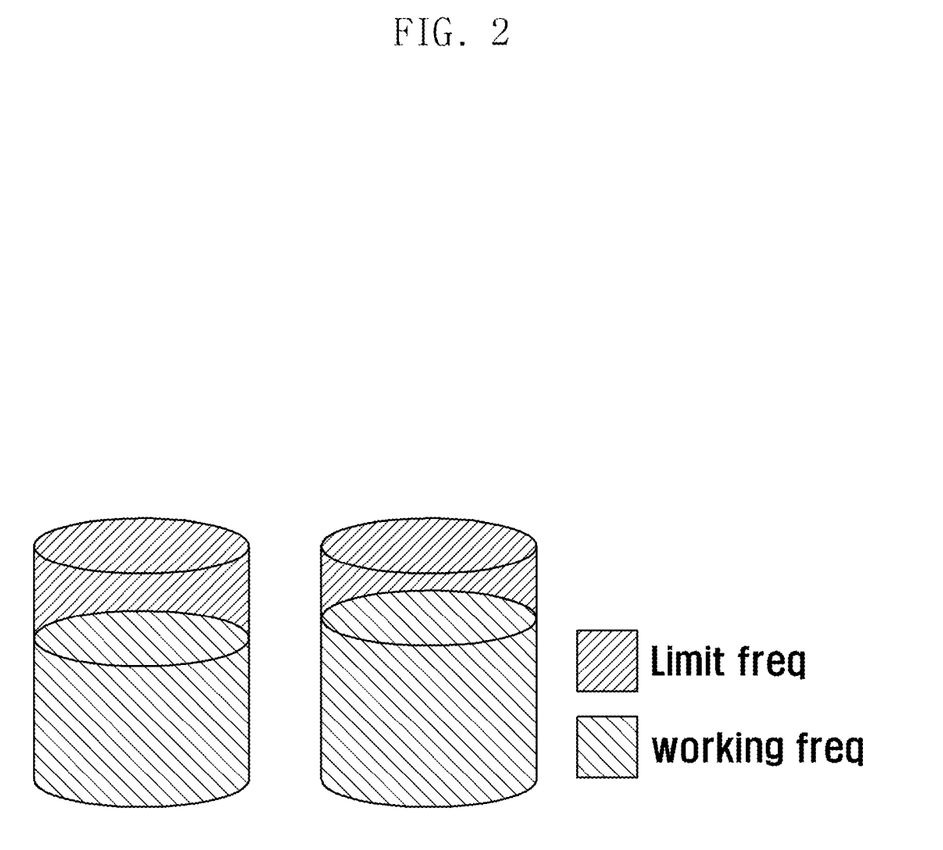
FIGS. 2 and 3 illustrate system clock frequencies in normal operation and power saving modes according to an exemplary embodiment of the present invention, respectively.
Figure 3:
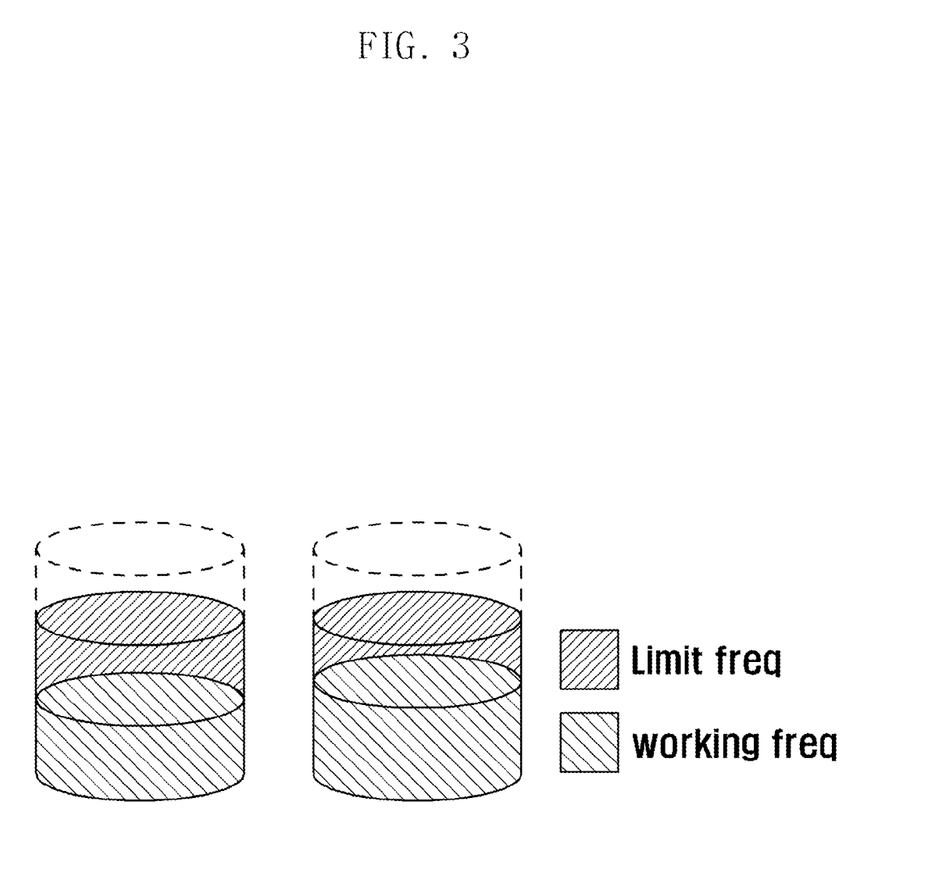

The mobile terminal having the above described configuration controls the system clock and/or the display unit according to system load. The mobile terminal may operate in the normal operation mode or the power saving mode according to user settings or the remaining battery power. FIGS. 2 and 3 illustrate system clock frequencies in normal operation and power saving modes, respectively.

FIG. 2 illustrates operations in the normal operation mode, where the mobile terminal operates at a specific clock frequency (indicated by "working freq") below the maximum clock frequency allowed in the normal operation mode (indicated by "limit freq") according to system load. The maximum clock frequency in FIG. 2 may correspond to the maximum clock frequency set for the control unit (for example, 1.2 GHz). FIG. 3 illustrates operations in the power saving mode, where the mobile terminal operates at a specific clock frequency (indicated by "working freq") below the maximum clock frequency allowed in the power saving mode (indicated by "limit freq"). For example, when the maximum clock frequency for the normal operation mode is 1.2 GHz, the maximum clock frequency for the power saving mode may be set to 800 MHz. In the power saving mode, the limit clock frequency acts as the maximum of the system clock frequency. The limit clock frequency in the power saving mode may be set through trial-and-error so as not to cause noticeable inconvenience to the user during application utilization, or may be selected by the user.

In addition to the reduction of the system clock frequency, the frame rate for the display unit 130 may be reduced in the power saving mode. In a sleep state, the control unit 100 stops operation of the display unit 130. In the power saving mode, the control unit 100 may adjust the frame rate for the display unit 130 so as to reduce the power consumed by the display unit 130. Here, the frame rate is reduced so as not to significantly degrade picture quality. Data is normally displayed at a frame rate of 60 fps (frames per second). It is assumed for this example that the frame rate is decreased to 30 fps in the power saving mode. Other frame rates having different picture qualities and power consumptions are of course possible.

As described before, the mobile terminal may operate at different clock frequencies according to load of the control unit 100. That is, the control unit 100 may vary the system clock frequency according to an imposed load during application execution. A table that specifies relationships between system clock frequencies and system load levels may be stored in the storage unit 110. Table 1 illustrates relationships between system clock frequencies and system load levels, where the maximum system clock frequency is assumed to be 1.2 gigahertz (GHz).

TABLE 1

| CPU load (%) | 20% | 30% | 60% | 80% | 90% |
|---|---|---|---|---|---|
| System clock frequency | 200 MHz | 500 MHz | 800 MHz | 1 GHz | 1.2 GHz |

Under conditions specified in Table 1, the control unit 100 may use up to 1.2 GHz as the system clock frequency according to load levels during application execution.

The control unit 100 checks the current system load to set the system clock frequency during an application execution. For example, referring to Table 1, when the CPU load is determined to be 20%, the control unit 100 sets the system clock frequency to 200 MHz for the application execution. When the CPU load is greater than or equal to 90%, the control unit 100 operates at the maximum system clock frequency, in this example 1.2 GHz. The increased operating speed of the control unit 100 may reduce the system load, at least temporarily. When the system load changes, the operating speed is adjusted accordingly. Later, when the system load increases up to 90%, the control unit 100 operates at the maximum system clock frequency again.

In the power saving mode, the control unit 100 operates at a clock frequency lower than the maximum system clock frequency for the normal operation mode (i.e., the limit clock frequency is set). One or more limit clock frequencies may be set for the power saving mode. A table that specifies limit clock frequencies for the power saving mode may also be stored in the storage unit 110. For example, under the assumption that the maximum clock frequency is 1.2 GHz, limit clock frequencies may be set as in Table 2.

TABLE 2

| | Number of occurrences of maximum clock frequency | |
|---|---|---|
| | 10 times | 20 times |
| Limit clock frequency | 1 GHz | 800 MHz |

Referring to Table 2, for a given time duration (for example, one minute), the control unit 100 repeats a process of measuring the system load, checking whether the clock frequency corresponding to the measured system load is equal to the maximum clock frequency, and counting the number of occurrences of the maximum clock frequency (the variable "Count_CPU_Max_freq" is increased by 1 if the maximum clock frequency occurs). For example, this process may be repeated 20 times per minute. Thereafter, the control unit 100 examines Count_CPU_Max_freq, and sets the limit clock frequency to 800 MHz when Count_CPU_Max_freq is greater than 20, and sets the limit clock frequency to 1 GHz when Count_CPU_Max_freq is greater than or equal to 10. That is, in the power saving mode, if the maximum clock frequency is determined to occur more often, a lower limit clock frequency is applied to thereby reduce the power consumption. If the maximum clock frequency is determined to occur less often, then excess power consumption is less likely to be occurring and a higher limit clock frequency is applied.

Alternatively, the limit clock frequency may be set to a default clock frequency by the system or set to a clock frequency selected by the user. In this case, a table specifying a limit clock frequency for the power saving mode may be stored in the storage unit 110. Table 3 illustrates a limit clock frequency for the power saving

TABLE 3

| Limit clock frequency | 800 MHz |
|---|---|

In addition to the setting of a limit clock frequency for the power saving mode, the battery power consumption may be further reduced by decreasing the frame rate of the display unit 130. That is, the simultaneous use of a reduced clock frequency for the processor and a reduced frame rate for the display can further reduce the battery power consumption. For example, display data stored in the frame buffer memory may be updated at a rate of 60 frames per second in the normal operation mode. In the power saving mode, display data stored in the frame buffer memory may be updated at a rate of 30 frames per second (by skipping every other frame). Hence, the battery power consumption is reduced.

In the power saving mode, when the limit clock frequency is set to 800 MHz and the frame rate is set to 30 fps, the system clock frequency may be set according to system load as shown in Table 4.

TABLE 4

| CPU load (%) | 20% | 30% | 60% or higher |
|---|---|---|---|
| system clock frequency | 200 MHz | 500 MHz | 800 MHz |
| frame rate | 30 fps | 30 fps | 30 fps |

Although only the example frame rate of 30 fps is shown in Table 4, the present invention is not limited thereto. That is, different frame rates may be set according to the different measured system loads.

Figure 4:
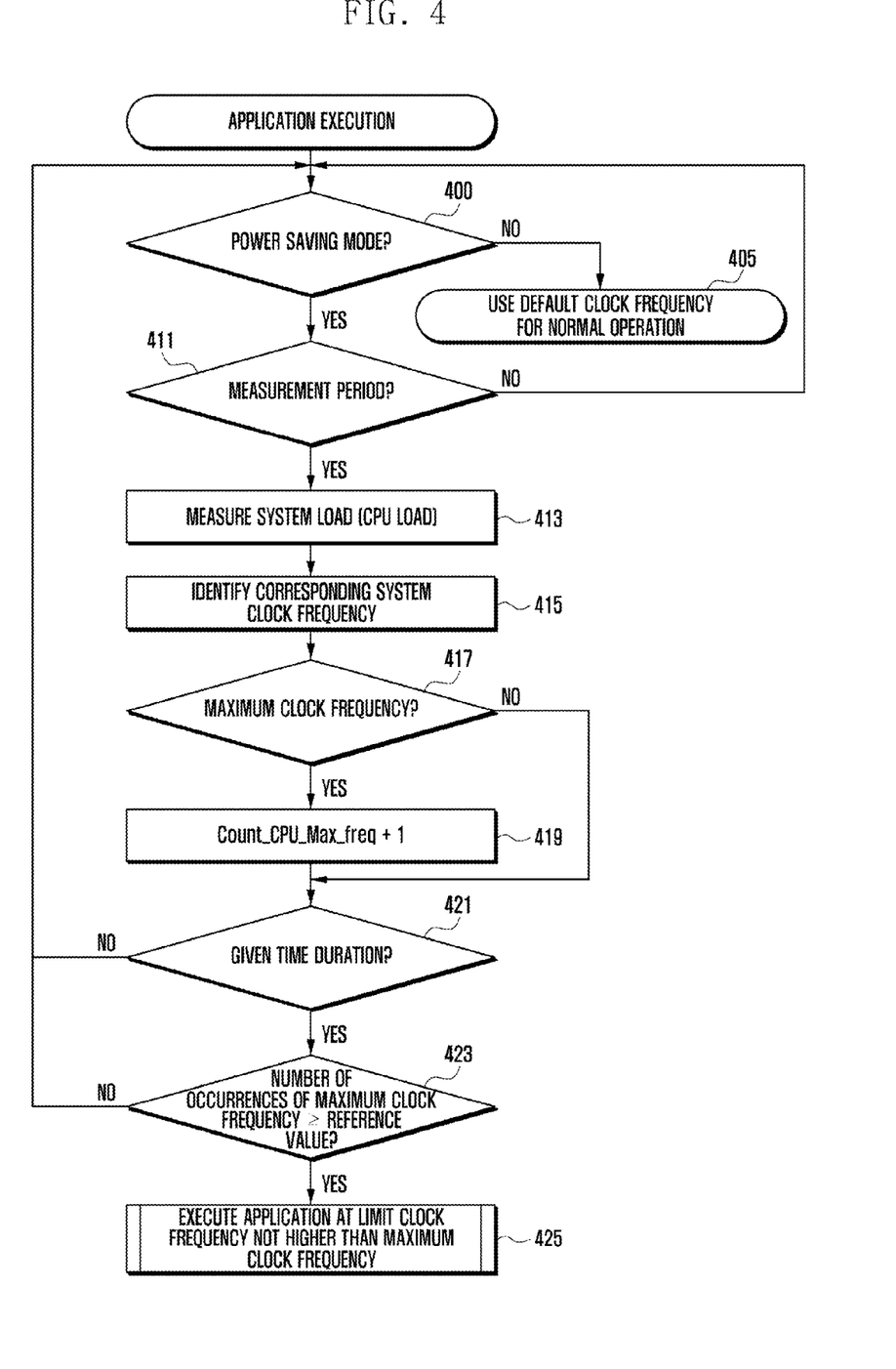
FIG. 4 is a flowchart of an application execution procedure for a mobile terminal operating in the power saving mode according to an exemplary embodiment of the present invention.

FIG. 4 is a flowchart of an application execution procedure for a mobile terminal operating in the power saving mode according to an exemplary embodiment of the present invention.

Referring to FIG. 4, in response to an execution request for an application, the control unit 100 checks whether the power saving mode is enabled at step 400. The user may initiate the power saving mode, for example, by using a menu item. When the power saving mode is not enabled, the control unit 100 may execute the requested application at the default clock frequency in the normal operation mode at step 405.

When the power saving mode is enabled, the control unit 100 sets a limit clock frequency by counting the number of occurrences of the maximum clock frequency in a given time duration. Here, it is assumed for example that the counting lasts for 1 minute and involves 50 ms long periods of load measurement. Tables 1 and 2 are referenced for setting of a limit clock frequency. Specifically, the control unit 100 checks the expiration of a measurement period at step 411. When the measurement period has expired, the control unit 100 measures the system load (CPU load) at step 413. The control unit 100 identifies a system clock frequency corresponding to the measured system load with reference to Table 1 at step 415. The control unit 100 checks whether the identified system clock frequency is equal to the maximum clock frequency (for example, 1.2 GHz) at step 417. When the identified system clock frequency is equal to the maximum clock frequency, the control unit 100 increases the counter (Count_CPU_Max_freq) by 1 at step 419. At step 417, the identified system clock frequency may be different according to the system load levels, and the maximum clock frequency may vary according to system settings.

That is, the control unit 100 measures the system load, identifies a system clock frequency corresponding to the system load, and checks for the occurrence of the maximum clock frequency once for each measurement period of 50 ms. This process is performed for the given time duration of 1 minute. The control unit 100 checks for the expiration of the given time duration at step 421. When the given time duration has expired, the control unit 100 checks whether the number of occurrences of the maximum clock frequency (Count_CPU_Max_freq) is greater than or equal to at least one reference value at step 423. When the number of occurrences of the maximum clock frequency is greater than or equal to the at least one reference value, the control unit 100 determines a corresponding limit clock frequency and executes the application at a clock frequency not higher than the determined limit clock frequency at step 425. That is, the determined limit clock frequency acts as a new maximum clock frequency when the mobile terminal operates in the power saving mode.

Figure 5:
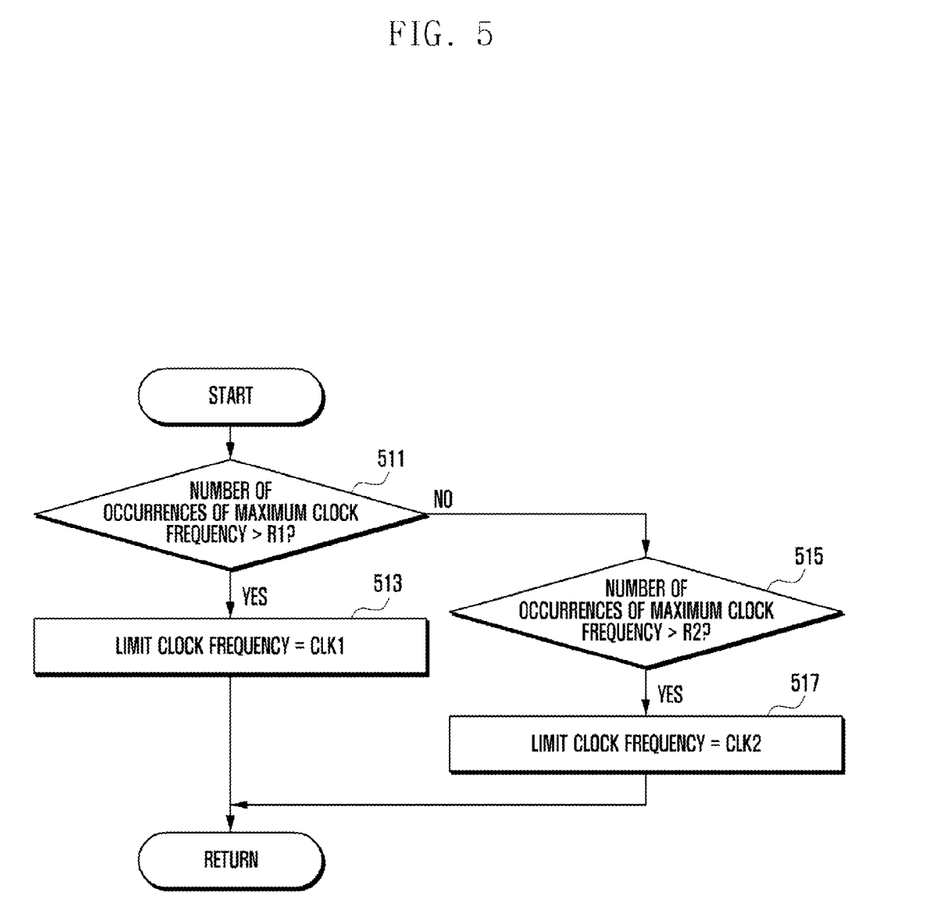
FIG. 5 is a flowchart of a step for setting a limit clock frequency in the flowchart of FIG. 4 according to an exemplary embodiment of the present invention.

One or more limit clock frequencies may be provided and one thereof may be selected for use. FIG. 5 is a flowchart of a method for setting a limit clock frequency as in step 425 in the flowchart of FIG. 4. In FIG. 5, one of multiple limit clock frequencies is selected for use. For ease of description, it is assumed that a limit clock frequency is selected using Table 2. In this case, reference values R1 and R2 are 20 and 10, respectively.

Referring to FIG. 5, the control unit 100 checks whether Count_CPU_Max_freq is greater than R1 (20). When Count_CPU_Max_freq is greater than R1, the control unit 100 sets the limit clock frequency to CLK1 (800 MHz) at step 513. When Count_CPU_Max_freq is not greater than R1, the control unit 100 checks whether Count_CPU_Max_freq is greater than R2 at step 515. When Count_CPU_Max_freq is greater than R2, the control unit 100 sets the limit clock frequency to CLK2 (1 GHz) at step 517.

After setting of the limit clock frequency, during application execution, the control unit 100 measures the system load and sets a system clock frequency corresponding to the system load. When the system clock frequency is lower than the limit clock frequency, the control unit 100 conducts the application execution at the system clock frequency; and when the system clock frequency is higher than or equal to the limit clock frequency, the control unit 100 conducts the application execution at the limit clock frequency. That is, in the power saving mode, although the system load is high, the limit clock frequency is used as the maximum clock frequency, thereby reducing power consumption. Further, in the power saving mode, display data stored in the frame buffer may be displayed at a reduced frame rate (for example, 30 fps) to reduce power consumption.

Figure 6:
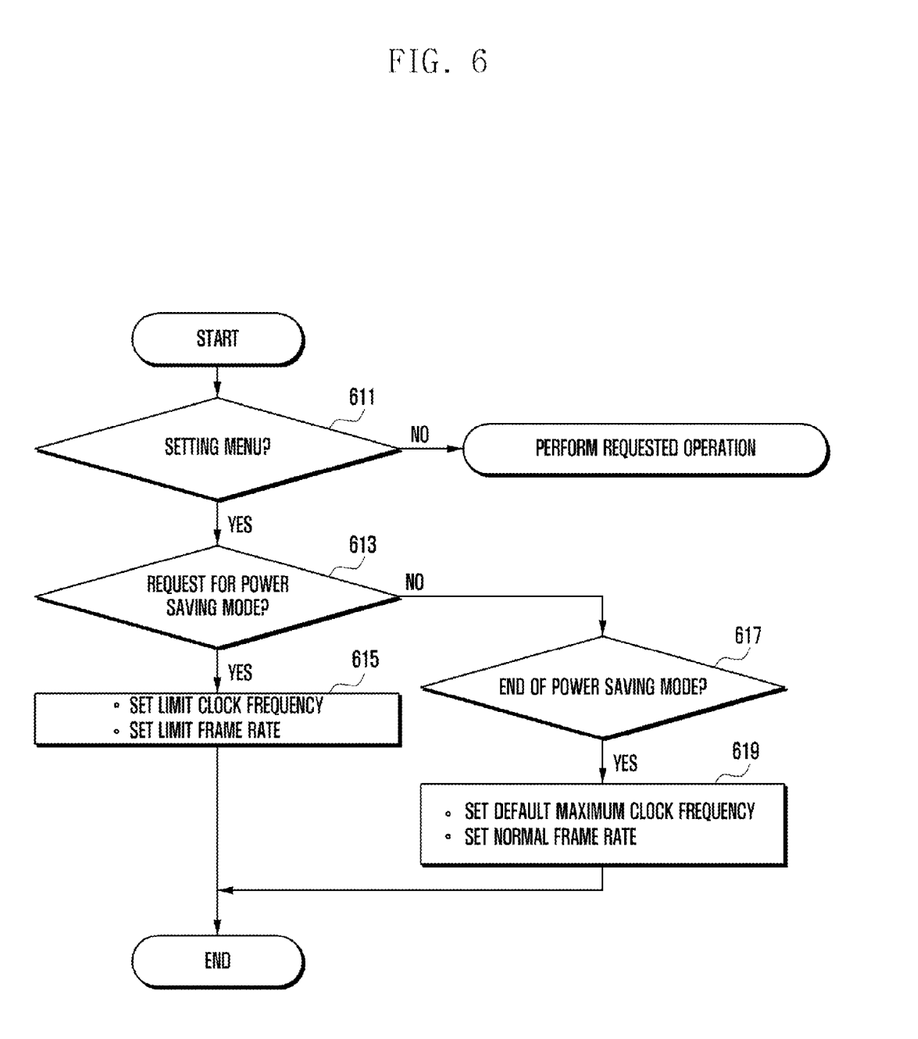
FIG. 6 is a flowchart of a procedure for setting a power saving mode according to an exemplary embodiment of the present invention.
Figure 7:
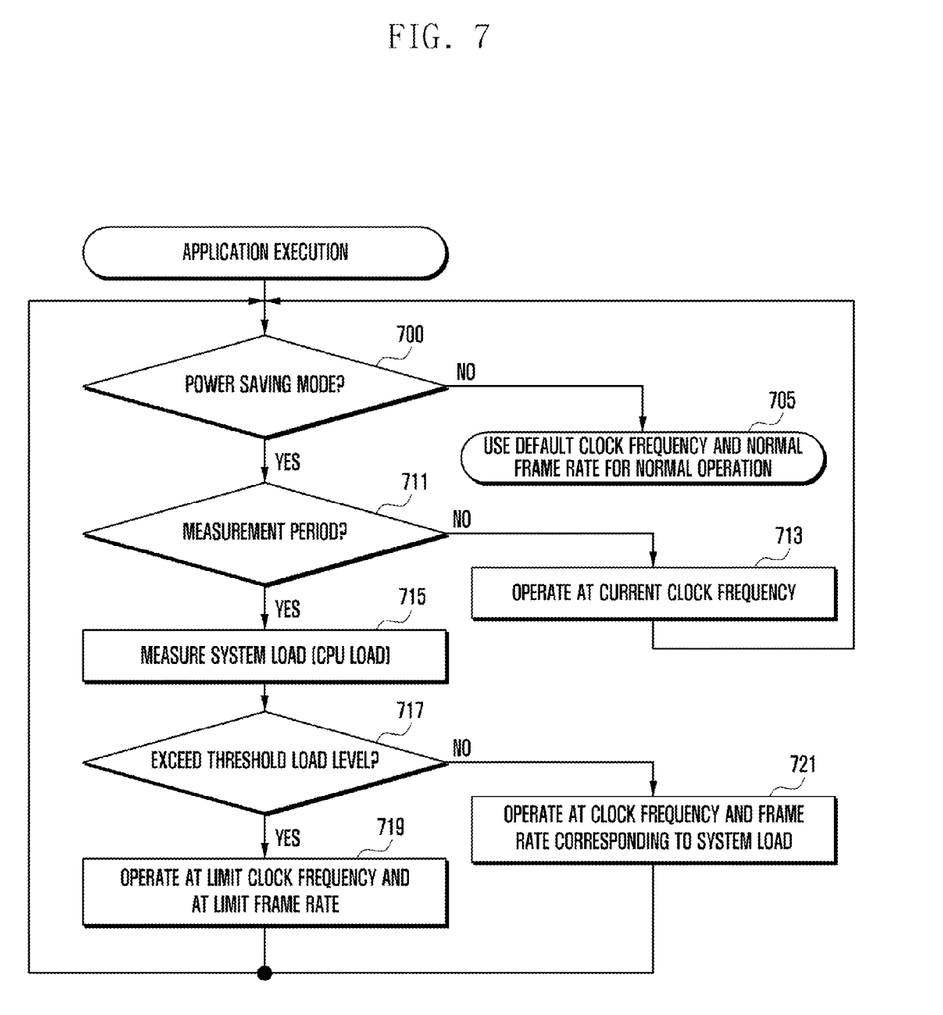
FIG. 7 is a flowchart of a procedure for executing an application in the power saving mode according to an exemplary embodiment of the present invention.

FIGS. 6 and 7 illustrate power saving mode operations according to an exemplary embodiment of the present invention. Here, FIG. 6 is a flowchart of a procedure for setting a power saving mode, and FIG. 7 is a flowchart of a procedure for executing an application in the power saving mode. In this exemplary embodiment, the power saving mode is configured by the user through a setting menu by setting a limit clock frequency and/or a limit frame rate.

Referring to FIG. 6, the user may set the power saving mode using a setting menu. The control unit 100 checks whether the setting menu is selected by the user 611. When the setting menu is selected, the control unit 100 checks whether a setting request for the power saving mode is made at step 613. When a setting request for the power saving mode is made, the control unit 100 sets a limit clock frequency and/or a limit frame rate at step 615. Here, the limit clock frequency may be set to a preset clock frequency as in Table 3, or alternatively may be set to a clock frequency selected by the user.

When a setting request for the power saving mode is not made at step 613, the control unit 100 checks whether a reset request for the power saving mode is made at step 617. When a reset request for the power saving mode is made, the control unit 100 recovers the default clock frequency and/or the default frame rate assigned to the normal operation mode at step 619.

Referring to FIG. 7, in response to an application execution request, the control unit 100 checks whether the power saving mode is enabled at step 700. If the power saving mode is not enabled, the control unit sets the default clock frequency and the normal frame rate for normal operation at step 705. When the power saving mode is enabled, the control unit 100 checks whether the current time belongs to a measurement period at step 711. Here, as described before, the measurement period may be 10 milliseconds. When the current time does not belong to a measurement period, the control unit 100 performs the application execution at a system clock frequency determined in the previous measurement period at step 713. When the current time belongs to a measurement period, the control unit 100 measures the system load at step 715. The control unit 100 checks whether the calculated system load exceeds a threshold load value at step 717. When the measured system load exceeds the threshold load value, the control unit 100 performs the application execution at the limit clock frequency and at the limit frame rate at step 719.

When the measured system load does not exceed the threshold load value, the control unit 100 performs the application execution at a clock frequency corresponding to the measured system load and at the limit frame rate at step 721. That is, the system clock frequency is set to a clock frequency corresponding to system load, and data display is performed at the limit frame rate.

The procedure of FIG. 7 is performed until the application execution is ended. In addition, the procedure of FIG. 7 may be applied to step 425 for the application execution in FIG. 4. That is, the control unit 100 may set a limit clock frequency in response to a request for the power saving mode, and control the application execution according to the procedure of FIG. 7 in the power saving mode.

When a navigation function is used in a mobile terminal such as a smartphone, the Global Positioning System (GPS) module, control unit, display unit, and the like are driven. In this case, the power saving mode of the present invention may be enabled to limit performance of the control unit and display unit so as to reduce the battery power consumed by the control unit and the display unit. The power saving mode of the present invention may be applied to the execution of applications imposing a heavy system load such as a gaming program so as to effectively reduce the battery power consumption caused by heavy system load. When functions related to online dictionaries, electronic mail, or the Internet are used, the baseband chipset, Access Point (AP) chipset, Liquid Crystal Display (LCD) module, and the like are driven. In this case, while the baseband chipset should be operated for interworking with the network, the AP chipset and LCD module may be operated in the power saving mode to reduce the battery power consumption. In conclusion, the mobile terminal reduces the battery power consumption without noticeable usability degradation by lowering the maximum clock frequency of the AP chipset and the maximum frame rate of the LCD screen in consideration of usability associated with application types.

In a feature of the present invention, the power saving apparatus and method enable a mobile terminal to operate at a system clock frequency and frame rate that are respectively lower than the maximum system clock frequency and maximum frame rate, but that do not significantly degrade the usability of the mobile terminal. Thereby, the mobile terminal reduces its battery power consumption. When the user executes an application program that is not performance critical, the power saving method can be selectively utilized to prolong the available battery usage time.

While the invention has been shown and described with reference to certain exemplary embodiments thereof, it will be understood those skilled in the art that various changes in form and details may be made therein without departing from the spirit and scope of the invention as defined by the appended claims and their equivalents.

What is claimed is:

1. A power saving apparatus for a mobile terminal, the apparatus comprising:
    a battery configured to supply power to individual components of the mobile terminal;
    a storage unit configured to store information regarding a maximum clock frequency for a normal operation mode and a limit clock frequency lower than the maximum clock frequency for a power saving mode; and
    a control unit configured to:
        measure, for a period of time during an application execution in the power saving mode, a system load,
        count a number of occurrences of the maximum clock frequency in a preset time duration,
        set, when the number of counted occurrences is greater than at least one reference value, the limit clock frequency corresponding to the at least one reference value,
        perform the application execution at the limit clock frequency if the measured system load exceeds a reference load level, and
        perform the application execution at a system clock frequency corresponding to the measured system load,
    wherein the performing of the application execution at the limit clock frequency reduces a battery power consumption.

2. The apparatus of claim 1, further comprising:
    a display unit, wherein the control unit is further configured to control, in the power saving mode, the display unit to display data stored in a frame buffer at a limit frame rate lower than a default frame rate for the normal operation mode, and wherein displaying the data at the limit frame rate reduces the battery power consumption.

3. The apparatus of claim 1, wherein the control unit is further configured to transition the mobile terminal to the power saving mode when a user selects a power saving menu item of an environment setting menu.

4. The apparatus of claim 1, wherein the control unit is further configured to automatically transition the mobile terminal to the power saving mode according to a remaining power level of the battery.

5. The apparatus of claim 1, wherein the at least one reference value comprises multiple different reference values, and wherein the control unit sets the limit clock frequency to the system clock frequency corresponding to one of the multiple different reference values according to the number of counted occurrences.

6. The apparatus of claim 1, wherein the control unit is further configured to, in the power saving mode, set the system clock frequency to a minimum of the limit clock frequency and a clock frequency determined according to the system load.

7. A power saving method for a mobile terminal comprising a battery supplying power to individual components and a storage unit storing information regarding a maximum clock frequency for a normal operation mode and a limit clock frequency lower than the maximum clock frequency for a power saving mode, the method comprising:

measuring a system load for a preset time during an application execution in the power saving mode;

setting, when the measured system load exceeds a reference load level, the limit clock frequency as a maximum clock frequency for the power saving mode;

measuring, in the power saving mode, the system load due to the application execution;

performing, when the measured system load exceeds the reference load level, the application execution at the limit clock frequency; and performing, when the measured system load does not exceed the reference load level, the application execution at a system clock frequency corresponding to the measured system load, wherein the performing of the application execution at the limit clock frequency reduces a battery power consumption, and wherein the setting of the limit clock frequency as the maximum clock frequency for the power saving mode comprises:

determining a system clock frequency corresponding to a system load measured for a measurement period;

counting a number of times the system clock frequency is equal to the maximum clock frequency for the normal operation mode for a given time duration; and setting, when the counted number of occurrences of the maximum clock frequency is greater than at least one reference value, the limit clock frequency.

8. The method of claim 7, further comprising:

setting a limit frame rate for the power saving mode lower than a default frame rate for the normal operation mode; and controlling, during the application execution in the power saving mode, a display operation to display data stored in a frame buffer at the limit frame rate, wherein displaying the data at the limit frame rate reduces the battery power consumption.

9. The method of claim 7, wherein the at least one reference value comprises multiple different reference values, and wherein setting the limit clock frequency comprises comparing the number of counted occurrences with the multiple different reference values and setting the limit clock frequency to a system clock frequency corresponding to one of the multiple different reference values according to the number of counted occurrences.

10. A method for a mobile terminal comprising a battery supplying power to individual components and a storage unit storing information regarding a maximum clock frequency for a normal operation mode and a limit clock frequency lower than the maximum clock frequency for a power saving mode, the method comprising:

activating the power saving mode to apply the limit clock frequency by selecting a power saving menu item of an environment setting menu;

measuring, in the power saving mode, a system load for a period of time during an application execution;

counting a number of occurrences of the maximum clock frequency in a preset time duration;

setting, when the number of counted occurrences is greater than at least one reference value, the limit clock frequency corresponding to the at least one reference value;

performing, when the measured system load exceeds a reference load level, the application execution at the limit clock frequency; and performing, when the measured system load does not exceed the reference load level, the application execution at a system clock frequency corresponding to the measured system load, wherein the performing of the application execution at the limit clock frequency reduces a battery power consumption.

11. The method of claim 10, wherein performing the application execution in the power saving mode comprises:

determining a system clock frequency corresponding to a system load measured for a measurement period during the application execution;

checking whether the measured system load exceeds the reference load level;

setting, when the measured system load exceeds the reference load level, the system clock to the limit clock frequency; and setting, when the measured system load does not exceed the reference load level, the limit clock frequency to the system clock frequency corresponding to the measured system load.

12. The method of claim 10, wherein the activating of the power saving mode further comprises setting a limit frame rate for the power saving mode lower than a default frame rate for the normal operation mode, wherein the performing of the application execution in the power saving mode further comprises controlling a display operation to display data stored in a frame buffer at the limit frame rate, and wherein displaying the data at the limit frame rate reduces a battery power consumption.

13. A power saving method for a mobile terminal comprising a battery supplying power to individual components, the method comprising:

determining whether the mobile terminal is in a normal mode comprising a maximum clock frequency or a power saving mode comprising a limit frequency lower than the maximum clock frequency;

determining a system load of the mobile terminal for a period of time during an application execution;

determining a system clock frequency according to the system load;

counting a number of occurrences of the maximum clock frequency in a preset time duration;

setting, when the number of counted occurrences is greater than at least one reference value, the limit clock frequency corresponding to the at least one reference value; and in the power saving mode, performing the application execution at a minimum of the determined system clock frequency and the limit clock frequency, wherein the performing of the application execution at the limit clock frequency reduces a battery power consumption from performing the application execution at a higher clock frequency.

14. The method of claim 13, wherein the determining of the system clock frequency comprises looking up in a table a frequency corresponding to the system load.

15. The method of claim 13, wherein the determining of the system load and the determining of the corresponding system clock frequency are repeated periodically.

* * * * *